United States Patent
Vries et al.

(10) Patent No.: US 7,538,058 B2
(45) Date of Patent: May 26, 2009

(54) SINTERED BODY AND ELECTRIC LAMP

(75) Inventors: Franciscus Leonardus Gerardus Vries, Uden (NL); Antonie Hubert Marie Kees, Uden (NL); Henricus Josephus Kunnen, legal representative, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 271 days.

(21) Appl. No.: 10/500,502

(22) PCT Filed: Dec. 18, 2002

(86) PCT No.: PCT/IB02/05618

§ 371 (c)(1),
(2), (4) Date: Feb. 22, 2005

(87) PCT Pub. No.: WO03/059839

PCT Pub. Date: Jul. 24, 2003

(65) Prior Publication Data

US 2005/0156527 A1    Jul. 21, 2005

(30) Foreign Application Priority Data

Jan. 4, 2002    (EP) .................................. 02075223

(51) Int. Cl.
*C04B 35/115* (2006.01)
*H01J 61/30* (2006.01)
(52) U.S. Cl. .......................... 501/153; 313/439; 313/636
(58) Field of Classification Search ................. 501/153; 313/636, 493
See application file for complete search history.

(56) References Cited

U.S. PATENT DOCUMENTS

| | | | | |
|---|---|---|---|---|
| 4,699,774 A | * | 10/1987 | Van Reine et al. | 423/625 |
| 5,541,480 A | * | 7/1996 | Renardus et al. | 313/635 |
| 5,625,256 A | * | 4/1997 | Tiedt et al. | 313/636 |
| 5,682,082 A | | 10/1997 | Wei et al. | |
| 6,639,362 B1 | * | 10/2003 | Scott et al. | 313/578 |
| 2005/0248277 A1 | * | 11/2005 | Van Bruggen et al. | 313/636 |

FOREIGN PATENT DOCUMENTS

| | | |
|---|---|---|
| EP | 0218279 | 4/1987 |
| JP | 2002203513 A | 7/2002 |

* cited by examiner

Primary Examiner—Karl E Group

(57) ABSTRACT

The sintered body of gastight translucent polycrystalline alumina contains oxidic magnesium, an oxidic second metal selected from erbium, holmium, thulium and dysprosium, and oxidic zirconium. The body can be used in a lamp vessel of an electric lamp.

6 Claims, 1 Drawing Sheet

SINTERED BODY AND ELECTRIC LAMP

The invention relates to a sintered body of gastight polycrystalline aluminum oxide containing magnesium in oxidic form and a second metal M in oxidic form.

The invention also relates to an electric lamp comprising a lamp vessel of gastight polycrystalline aluminum oxide containing magnesium in oxidic form and a second metal M in oxidic form.

An embodiment of such a sintered body is known from EP-A-0 218 279

In addition to MgO in a quantity by weight of maximally 1000 ppm, the known body comprises $Er_2O_3$ in a quantity by weight of 20 to 200 ppm. The body can suitably be used in the lamp vessel of a high-pressure discharge lamp having a sodium-containing filling. In commercially available lamps, the body gives satisfactory results, however, it has been found that properties of the lamps are subject to change during the service life.

It is a first object of the invention to provide a sintered body of the type described in the opening paragraph, which, when used in a lamp vessel of an electric lamp, counteracts changing of lamp properties.

A second object of the invention is to provide an electric lamp of the type described in the opening paragraph, wherein changing of properties during the service life of the lamp is counteracted.

The first object is achieved in accordance with the invention in that the second metal M is selected from erbium, holmium, dysprosium and thulium, and the aluminum oxide further comprises zirconium in oxidic form, magnesium calculated as MgO being present in a quantity by weight of 50 to 1000 ppm, the second metal calculated as $M_2O_3$ being present in a quantity by weight of 10 to 100 ppm, and zirconium calculated as $ZrO_2$ being present in a quantity by weight of 50 to 600 ppm.

The invention is based on the recognition that the use of bodies of sintered aluminum oxide containing only MgO and $Er_2O_3$ causes spinel to be present in a lamp vessel of an electric lamp, for instance at or near to an inner surface of the lamp vessel, which reacts with the filling of the lamp, thereby causing properties, such as lamp voltage, spectrum of the emitted light and/or color point, to change. This is in particular severe in cases of lamps having an unsaturated filling of the lamp vessel, like for instance unsaturated high pressure sodium (HPS) lamps. The invention is also based on the recognition that $ZrO_2$ counteracts spinel-formation, but also that only a limited quantity of $ZrO_2$ can be used for this purpose in order to preclude that, for example, at a larger quantity than that mentioned above, a zirconium-containing second phase would develop on the inner surface of the lamp vessel. Such a second phase is undesirable because it adversely affects the light efficiency of the lamp and the mechanical strength of the lamp vessel. Too large a quantity of $ZrO_2$ also causes an unfavorable change of the crystal-size distribution of the aluminum oxide. The invention also gives the advantage that dysprosium, holmium and thulium can suitably be used as the second metal instead of erbium. The invention thus provides a larger number of starting materials to choose from. Unlike erbium, holmium, dysprosium and thulium additionally are metals that occur in fillings of metal-halide lamps, so that these metals are not "foreign to said lamps". A favorable effect of the invention is that it is possible to form polycrystalline aluminum oxide sintered bodies, which have a much improved resistance against chemical attack, in particular with respect of Na. This is favorable with respect to the lifetime amongst others of ceramic lamps, in particular of unsaturated BPS lamps. A further favorable effect is the possibility to construct more compact discharge vessels without harming of properties during the service life of the lamp.

Magnesium is present in the aluminum oxide to regulate crystal growth. If the amount of magnesium is insufficient, a very irregular crystal structure is formed and comparatively large crystals as well as comparatively small crystals occur. Comparatively small crystals reduce the light transmission of the body; comparatively large crystals reduce the mechanical strength of the body. An upper limit is set to the quantity of magnesium in order to counteract the formation of spinels at or near the surface of the body as well as in its bulk.

Also the second metal regulates crystal growth and, when used in a lamp vessel, limits exchange reactions with the gas filling of the lamp vessel. If the quantity of the second metal is too small, crystal growth is irregular and consequently the resulting crystal structure. Also a quantity in excess of said quantity causes irregular crystal growth and structure.

Also zirconium influences crystal growth. At a quantity below the indicated quantity, there is hardly an effect detectable in the resulting crystal structure; at quantities above the indicated quantities, zirconium-containing material is secreted at the surface of the body as so called second phase. The secreted second phase component possibly enters the discharge and thus reduces the light output of the lamp.

In a particular embodiment of the body, magnesium calculated as MgO is present in a quantity by weight of 50 to 500 ppm, the second metal calculated as $M_2O_3$ is present in a quantity by weight of 20 to 50 ppm, and zirconium calculated as $ZrO_2$ is present in a quantity by weight of 200 to 500 ppm. This embodiment proved to be suitable for the light transmission, the mechanical strength and the resistance to the action of elements foreign to the body.

It proved to be very advantageous if the sintered body comprises magnesium calculated as MgO in a quantity by weight of 50 to 500 ppm, the second metal calculated as $M_2O_3$ in a quantity by weight of 30 to 50 ppm and zirconium calculated as $ZrO_2$ in a quantity by weight of 200 to 400 ppm.

The body may vary in shape, but in general it is tubular with a round section. Alternatively, the body may be a flat, round disc with a central opening. A tubular body that is connected to such a flat, round disc at both ends in a gastight manner can readily be used as a lamp vessel of an electric lamp. Alternatively, it is favorable if a tubular body which is connected to a flat, round disc at both ends in a gastight manner has a tubular body in the opening of the discs, which body is connected in a gastight manner to the disc. The latter body can very suitably be used as a lamp vessel of an electric lamp, which lamp vessel locally has a comparatively high temperature during operation.

The body can be manufactured in various ways. The components of the body, or substances from which the components are formed when said substances are exposed to heat, may be dry-mixed, granulated and molded. It is also possible to add a minority component, for example a compound of the second metal, to the molding by impregnating the molding with said minority component. It is favorable, however, to produce a kneadable mass of the components and a binder, and subsequently subject said mass to, for example, extrusion. The molding may be dried and subsequently heated, for example in an oxygen-containing atmosphere, for example air, to decompose the binder. Subsequently, the molding is heated to obtain a sintered body that is gastight and light-transmitting.

To obtain a body having sintered compounds between a disc and a tube, use is made of a pre-sintered and hence already shrunk first body. Said first body is introduced into a second body with a slight amount of clearance, which second body is not pre-sintered or pre-sintered to a smaller degree. The assembly can be introduced, if necessary, into a third body with a slight amount of clearance, which third body is not pre-sintered or pre-sintered even less than the second body. If the shape of the assembled body obtained corresponds to the shape of the ultimately desired sintered body, then the sintering process can be carried out. In this process, an outermost part shrinks more than a more inwardly situated part, and sintered compounds between the constituent parts are obtained, resulting in a single, light-transmitting, sintered, gastight body of polycrystalline aluminum oxide.

The second object of the invention is achieved in that the lamp vessel comprises the sintered body in accordance with the invention.

The electric lamp may be a high-pressure discharge lamp, for example a high-pressure sodium vapor discharge lamp or a high-pressure metal-halide discharge lamp; in this case for example a tungsten electrode pair is present in an ionizable gas. Alternatively, the lamp may be a halogen incandescent lamp. In this case, a tungsten incandescent body is present in a halogen-containing gas, such as a hydrogen bromide-containing gas.

EXAMPLE

An in itself known quantity of aluminum oxide, organic binder, magnesium acetate, erbium acetate, and water were thoroughly mixed by kneading, together with zirconium acetate. The mass was extruded into tubes. The tubes were dried and subsequently heated in a known way to a temperature between 1150 and 1400° C. to decompose the binder and the salts. In an alternative process a shaped body, for instance a tube, of aluminum oxide, magnesium oxide and erbium oxide processed itself in well known way is impregnated with zirconium in a solution of zirconium acetate. The shaped body is then dried and heated in well-known manner to a temperature between 1000 and 1400° C. to decompose the salts. In the end portions of the tubes, cylindrical, drilled-through discs were provided, after which the assembled bodies were sintered in known manner with temperatures rising to approximately 1800 degrees Celsius. The aluminum oxide bodies obtained comprises 300 ppm by weight MgO, 50 ppm by weight $Er_2O_3$ and 400 ppm by weight $ZrO_2$ and can suitably be used as lamp vessels of high-pressure sodium lamps.

Embodiments of the electric lamp in accordance with the invention are shown in the drawing. In the drawing FIG. 1 is a side view of a high-pressure discharge lamp;

Figure 1:
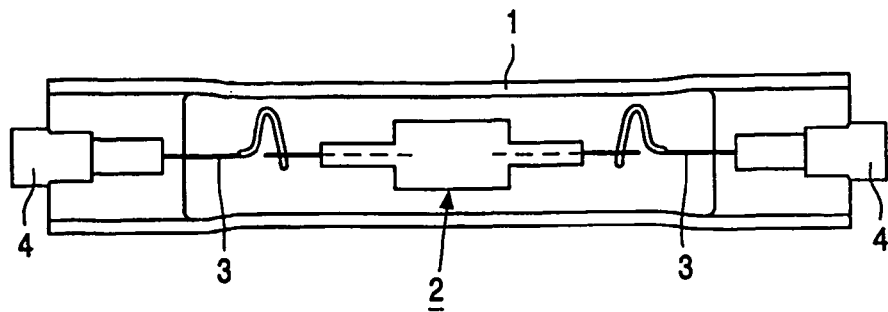

In FIG. 1 the lamp has an outer envelope 1 of quartz glass accommodating a sintered body in accordance with the invention which serves as a lamp vessel 2 made of translucent, gastight, sintered aluminum oxide, which is connected to current conductors 3 which are connected to contacts 4.

Figure 2:
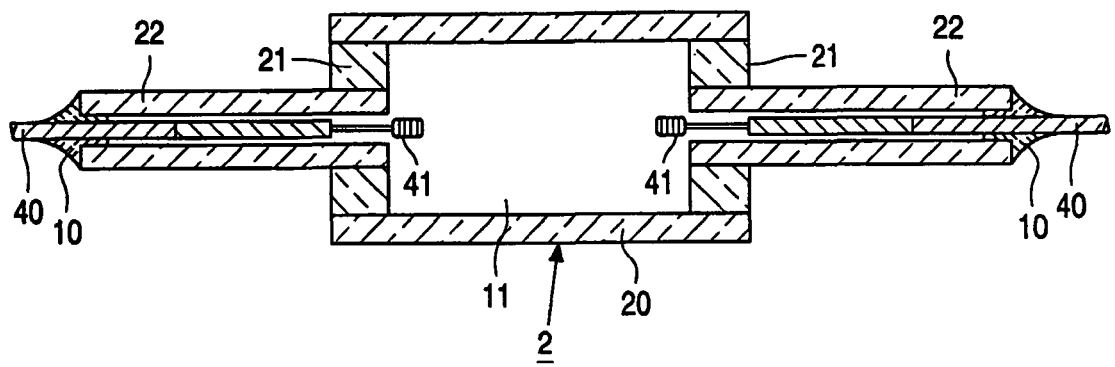
FIG. 2 is a longitudinal sectional view of the lamp vessel of the lamp shown in FIG. 1.

The lamp vessel 2, see FIG. 2, is composed of a cylindrical tube 20 which is connected to discs 21 in a gastight manner by sintering. In a central opening in the discs 21, a narrow tube 22 is fixed by sintering. The tubes 20 and 22, and the discs 21 are added together after the tubes 22 are comparatively thoroughly pre-sintered, the discs 21 are less pre-sintered and the tube 20 is comparatively slightly pre-sintered. Subsequent sintering of the assembly resulted in a sintered body in accordance with the invention.

Conductors 40 are fixed in a gastight manner in the narrow tubes 22 by means of a fused jointing material 10. The conductors 40 each carry a tungsten electrode 41. The space 11 enclosed by the lamp vessel 2 is filled with an inert gas and sodium amalgam.

Figure 3:
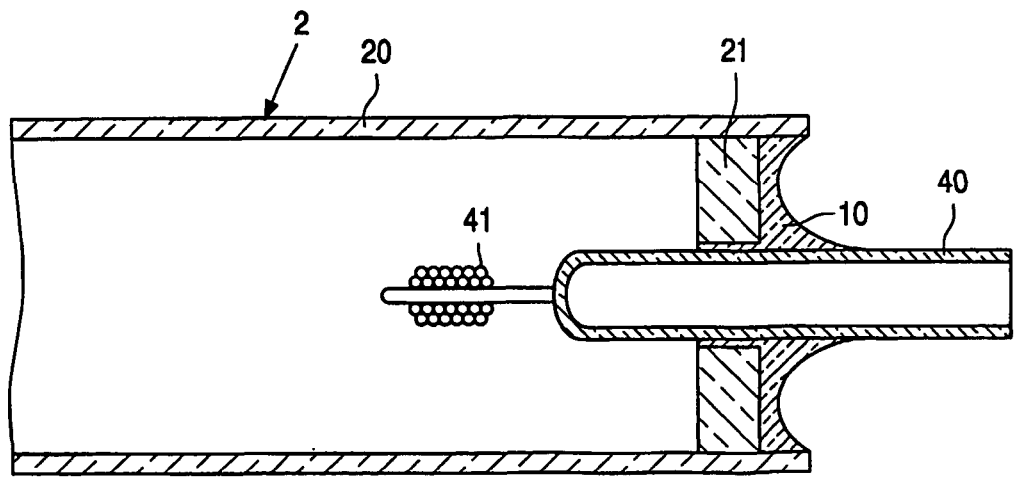
FIG. 3 is a longitudinal sectional view of a different embodiment of a lamp vessel.

In FIG. 3, parts corresponding to parts shown in FIG. 2 bear the same reference numerals as in FIG. 2. The end portion (not shown) of the lamp vessel 2 corresponds to the end portion shown. At both ends the tube 20 is closed by a disc 21 by means of sintering. A niobium bus serving as a conductor 40 carrying the electrode 41 is secured in the disc 21.

In an experiment the effect on lamp spectral properties during the service life of the lamp was tested with unsaturated HSP lamps. It is well known that as prime indicator for the spectrum of HPS lamps counts the wavelength difference $\Delta\lambda$ between the maxima of the self-reversed sodium D-lines in the spectrum.

In a series of lamps with a nominal power of 70 W having a discharge vessel according to the invention it was established that the value of $\Delta\lambda$ was almost constant over a service period of 1000 hours. This indicates that the Na content of the filling stayed constant and that no significant amount of other component entered the discharge during the service period.

In a further series of lamps with a discharge vessel according to the known art, having identical filling and nominal power the value of $\Delta\lambda$ at the start of the service life was 33 nm. After a service period of 1000 hours the value of $\Delta\lambda$ had decreased to 20 nm, indicating serious loss of sodium from the discharge.

The invention claimed is:

1. A sintered body of gastight polycrystalline aluminum oxide containing magnesium in oxidic form and a second metal M in oxidic form, wherein the second metal M is selected from holmium and thulium, and the aluminum oxide further comprises zirconium in oxidic form, the magnesium being calculated as MgO and being present in a quantity by weight of 50 to 1000 ppm, the second metal being calculated as $M_2O_3$ and being present in a quantity by weight of 10 to 100 ppm, and zirconium being calculated as $ZrO_2$ and being present in a quantity by weight of 50 to 600 ppm.

2. The sintered body as claimed in claim 1, wherein the MgO is present in a quantity by weight of 50 to 500 ppm, the $M_2O_3$ is present in a quantity by weight of 20 to 50 ppm, and the $ZrO_2$ is present in a quantity by weight of 200 to 500 ppm.

3. A sintered body of gastight polycrystalline aluminum oxide containing magnesium in oxidic form and a second metal M in oxidic form, wherein the second metal M is selected from holmium and thulium, and the aluminum oxide further comprises zirconium in oxidic form, the magnesium being calculated as MgO and being present in a quantity by weight of 50 to 500 ppm, the second metal being calculated as $M_2O_3$ and being present in a quantity by weight of 30 to 50 ppm, and zirconium being calculated as $ZrO_2$ and being present in a quantity by weight of 200 to 400 ppm.

4. An electric lamp comprising a lamp vessel of gastight polycrystalline aluminum oxide containing magnesium in oxidic form and a second metal M in oxidic form, wherein the second metal M is selected from holmium and thulium, and the aluminum oxide further comprises zirconium in oxidic form, the magnesium being calculated as MgO and being present in a quantity by weight of 50 to 1000 ppm, the second metal being calculated as $M_2O_3$ and being present in a quantity by weight of 10 to 100 ppm, and zirconium being calculated as $ZrO_2$ and being present in a quantity by weight of 50 to 600 ppm.

5. The electric lamp as claimed in claim 4, wherein the MgO is present in a quantity by weight of 50 to 500 ppm, the $M_2O_3$ is present in a quantity by weight of 20 to 50 ppm, and the $ZrO_2$ is present in a quantity by weight of 200 to 500 ppm.

6. The electric lamp as claimed in claim 4, wherein the MgO is present in a quantity by weight of 50 to 500 ppm, the $M_2O_3$ is present in a quantity by weight of 30 to 50 ppm and the $ZrO_2$ is present in a quantity by weight of 200 to 400 ppm.

* * * * *